March 6, 1956 W. C. SAEMAN 2,737,451
CRYSTALLIZATION
Filed Aug. 3, 1953
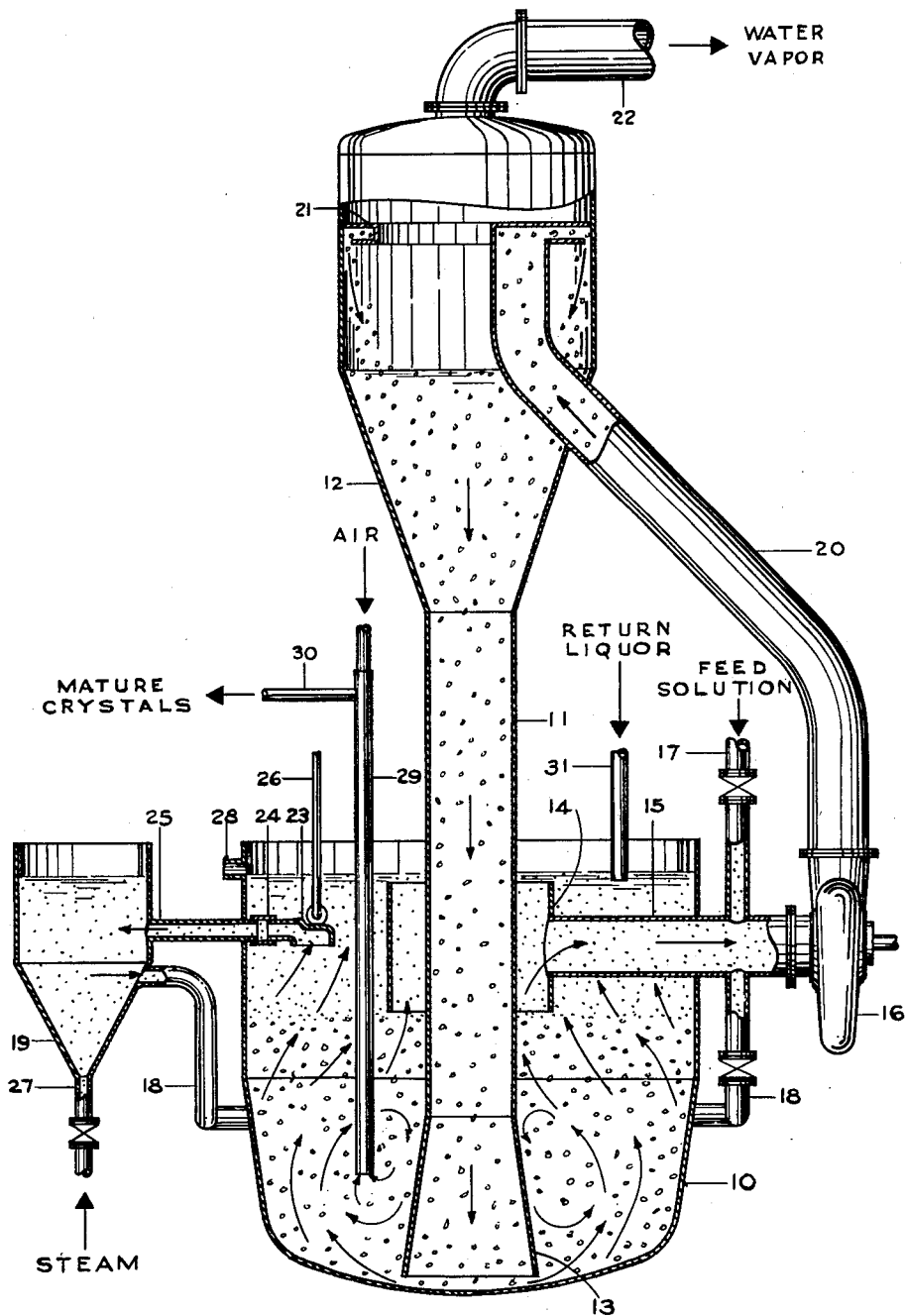
Walter C. Saeman INVENTOR.
BY Bentley C Morrow
attorney

United States Patent Office 2,737,451
Patented Mar. 6, 1956

2,737,451

CRYSTALLIZATION

Walter C. Saeman, Orange, Conn., assignor to Tennessee Valley Authority, a corporation of the United States Application August 3, 1953, Serial No. 372,208

2 Claims. (Cl. 23—302)

(Granted under Title 35, U. S. Code (1952), sec. 266)

The invention herein described may be manufactured and used by or for the Government for governmental purposes without payment to me of any royalty thereon.

This invention relates to improvements in methods for the crystallization of ammonium nitrate. It relates in particular to a method whereby strong, dense, uniformly sized crystals of ammonium nitrate can be produced at high production rates.

In U. S. Patent 2,567,968 I have described a process for crystallizing ammonium nitrate in which crystal growth occurs in a zone maintained in substantially vertical streamlined rotation. It was found in large-scale operation of that process that coarse, strong crystals of ammonium nitrate could be produced at rates up to 40 tons per day in a crystallizing vessel 16 feet, 6 inches in diameter by 19 feet, 5 inches deep. At rates above 40 tons per day, the product contained excessive amounts of fine, relatively weak crystals.

This invention is an improvement of the process described in my earlier patent, U. S. 2,567,968.

With some substances, the rate of production may be increased by increasing the supersaturation of the mother liquor, thereby increasing the rate at which the crystals are grown. Production of ammonium nitrate cannot be increased by increasing the supersaturation, because crystals of ammonium nitrate that are grown rapidly are very weak and therefore are unsuitable for most of the uses to which ammonium nitrate is put. For example, rapidly grown crystals of ammonium nitrate are completely unsuitable for use as fertilizer because they are fine, have very poor structure, and form solid cakes or lumps during storage.

In order to maintain steady-state operation of a continuous crystallizer system the number of crystals withdrawn from the system within a given interval of time must be equal to the number of new crystals formed within that interval. New crystals are formed by attrition and collision among crystals in the suspension, and by the spontaneous formation of nuclei in supersaturated solution.

For fertilizer use, and for other purposes as well, a product consisting of smooth, coarse, strong crystals, substantially free of fine crystals, is desired. Even at moderate production rates, however, the rate at which new crystals are formed is greatly in exces of the rate at which crystals within the desired size range are produced. In order to obtain a product having the desired characteristics, therefore, it is necessary to separate and remove from the system the excess fine crystals. The relationship that must obtain for steady-state continuous operation may be expressed by the equation $$X = Y + Z$$

where X equals the number of crystals formed within a given interval of time, Y equals the number of crystals removed as product within the interval, and Z equals the number of crystals removed as fines within the interval.

This relationship can be maintained by operating a crystallizer system in accordance with the method described in my prior Patent No. 2,567,968. The prior art, however, does not suggest a method whereby this relationship can be maintained in a system in which crystals are circulated along with solution through an evaporation zone.

In the method described in U. S. 2,567,968 crystal growth takes place only within the crystallizer vessel. By departing from that method and circulating crystals through the evaporator, the production capacity of a given apparatus can be increased. The volume of solution available for crystal growth and the weight of crystals in suspension are increased thereby, thus permitting greater output. Such a procedure does not provide a means for segregating fine crystals, however, and the product consists of a mixture of fine and coarse crystals. Moreover, the proportion of fines in the product increases steadily with time.

It is an object of this invention to provide a method for producing, at high production rate, ammonium nitrate crystals that are smooth, coarse, and strong, and substantially free from fines.

Another object is to provide a method for segregating and withdrawing fine crystals from a crystallizing zone.

Another object is to provide a method for producing ammonium nitrate crystals suitable for fertilizer use at high production rate.

Other objects will become apparent as this disclosure proceeds.

I have now found that these objects may be attained by maintaining within a crystallizing vessel a moving suspension of crystalline ammonium nitrate in a solution of ammonium nitrate having an average supersaturation of about 3 pounds of ammonium nitrate per 1000 gallons of solution, the upper one-sixth of one-third of the depth of said suspension being divided vertically into two zones, one of which is of substantially greater area than the other; introducing into the lower part of said suspension a stream of ammonium nitrate solution having a supersaturation of about 8 to 14 pounds of ammonium nitrate per 1000 gallons, and carrying in suspension crystals of ammonium nitrate; withdrawing from the smaller of the two said upper zones a suspension of coarse and medium-size crystals in a saturated solution at such a rate that the contents of the entire system are circulated 0.3 to 0.6 times per minute; introducing the suspension thus withdrawn from said smaller upper zone into an evaporator; therein concentrating the solution to a supersaturation of about 8 to 14 pounds per 1000 gallons; reintroducing the resulting suspension of crystals and supersaturated solution into the lower part of the said suspension in the crystallizing vessel; withdrawing from the larger of the two said upper zones a suspension consisting of relatively fine crystals of ammonium nitrate and saturated solution; dissolving the fine crystals in said suspension; introducing the resulting solution into the evaporator; introducing makeup solution of ammonium nitrate into the evaporator; and withdrawing from a lower portion of the suspension within the crystallizing vessel a suspension of relatively large crystals of ammonium nitrate.

The single accompanying drawing is a sectional elevation depicting apparatus in which my novel process can be carried out.

Referring to the drawing, reference numeral 10 designates a crystallizing vessel. A barometric leg 11, attached to and communicating with vacuum evaporator 12, enters vessel 10 substantially vertically and extends to a location near the bottom of the vessel 10, where it terminates in flared portion 13. A cylindrical baffle 14 is disposed to surround barometric leg 11 in spaced relationship in an upper part of vessel 10. The vertical width of baffle 14 should be about one sixth to one third of the depth of solution in vessel 10. The baffle thus vertically divides the upper part of the solution into two zones, an outer zone which is of substantially greater area than an inner zone enclosed by the baffle. A pipe 15, attached to the suction inlet of pump 16, communicates with an opening in baffle 14 and is adapted to withdraw slurry from the zone enclosed by baffle 14. Communicating with pipe 15 are valved feed-solution line 17 and valved solution line 18 from tank 19. Crystals and slurry from pipe 15 are pumped by pump 16 to evaporator 12 via line 20. Line 20 terminates within evaporator 12 in distributor 21, which is adapted to discharge the slurry downwardly along the walls of evaporator 12. Line 22 communicates with the upper portion of evaporator 12 and is connected to means, not shown, for producing a vacuum, such as a series of steam jet ejectors. Line 22 is adapted to withdraw water vapor under reduced pressure from evaporator 12. Intake 23 is disposed in the upper portion of vessel 10 outside the region enclosed by baffle 14 and is adapted to withdraw a slurry consisting of fine crystals and saturated solution from this upper portion. Intake 23 is connected by flexible sleeve 24 to pipe 25, which communicates with tank 19. Rod 26 is adapted to raise and lower intake 23. Valved line 27 communicates with the bottom of tank 19 and is used to admit steam for the purpose of dissolving fine crystals within tank 19. Solution is withdrawn from tank 19 via valved line 18 which, as stated, communicates with the suction of pump 16. Overflow pipe 28 is disposed in an upper portion of vessel 10 to maintain a constant level of liquor within the vessel. Means for removing mature crystals, shown as air lift 29, are disposed in vessel 10 and are adapted to remove a slurry of mature crystals from the lower part of the vessel and to discharge the slurry through line 30. Line 31 is provided for returning liquor separated from the slurry to the system.

In operation, a suspension consisting of supersaturated solution and crystalline ammonium nitrate is introduced into the lower part of crystallizing vessel 10 through barometric leg 11. The suspension leaving the flared portion 13 of the barometric leg 11 is deflected by the bottom of the vessel 10 and flows radially outward from the barometric leg. The suspension is diverted upwardly by the wall of the vessel. A major portion of the suspension—about 80 to 95 per cent—is drawn into the upper zone enclosed by baffle 14, hereinafter called the pump-suction zone. The suspension is withdrawn from the pump-suction zone by pump 16 and is introduced into evaporator 12. The evaporator 12 is under vacuum created by a series of steam jet ejectors which are not shown in the drawing. Water vapor is flashed from the solution, leaving the solution in supersaturated condition. The supersaturated solution and the crystals suspended therein flow down through the barometric leg 11 and are reintroduced into crystallizer vessel 10.

A minor portion of the suspension—about 5 to 20 per cent—enters the zone between baffle 14 and the wall of the crystallizer vessel 10. This zone is termed the elutriation zone hereinafter. The upper edge of the baffle is positioned slightly below the level of the liquor in the vessel, so that there is a flow of liquor from the elutriation zone over the upper edge of the baffle and into the zone enclosed by the baffle. This flow of liquor over the upper edge of the baffle induces an upward flow of liquor in the elutriation zone. This upward flow is of such a velocity—preferably about 0.01 to 0.03 foot per second—that fine crystals, which tend to segregate from the faster-moving body of liquor in the region below the baffle, are suspended in the elutriation zone. The velocity of the upward flow may be increased by raising the height of the liquor level in the vessel with respect to the upper edge of the baffle, or decreased by lowering the liquor level. By increasing the velocity in the elutriation zone, larger crystals and a greater number of crystals are suspended therein.

Fine crystals suspended in the elutriation zone are withdrawn into tank 19 via intake 23, flexible sleeve 24, and pipe 25. Flow of slurry from the vessel 10 to tank 19 is induced by pump 16, the suction of which is connected to tank 19 by valved line 18. Steam is introduced into the bottom of tank 19 via line 27 in sufficient quantity to dissolve all the fine crystals withdrawn from the elutriation zone.

For proper control of the process it is desirable that the fine crystals be withdrawn from the elutriation zone at a constant rate. Inasmuch as the rate at which fine crystals enter the elutriation zone varies, provision must be made to take care of this variation in rate. To this end the intake 23 is so arranged that it can be raised or lowered. At times when the rate at which fine crystals enter the elutriation zone is higher than average, the intake is raised, and when the rate is lower than average the intake is lowered. By this means the rate of withdrawal of fine crystals can be maintained substantially constant. The level of the intake 23 can be adjusted manually or it can be adjusted by automatic control means.

Fresh solution is introduced into the system via valved line 17 at a rate such that the weight of ammonium nitrate contained in the solution is about equal to the weight of ammonium nitrate withdrawn as product crystals.

The intake of air lift 29 is located at the point in the crystallizer vessel 10 where the concentration of large crystals is the greatest. Solution withdrawn along with product crystals by air lift 29 is separated from the crystals by means, not shown, such as a centrifuge, and the separated solution is returned to the system via line 31.

Growth of crystals in the suspension takes place within evaporator 12 and barometric leg 11, and within crystallizer vessel 10 below the lower edge of baffle 14. The supersaturation induced in the evaporator is about 14 pounds per 1000 gallons. The supersaturation is reduced to about 8 pounds per 1000 gallons by growth of crystals as the suspension flows down through the barometric leg and is reduced sharply by dilution when the suspension contacts the body of liquor in the crystallizer vessel 10. Above the lower edge of baffle 14 the solution is essentially desupersaturated. The average supersaturation within the evaporator and barometric leg is about 10 pounds per 1000 gallons and is approximately 3 pounds per 1000 gallons in the crystallizer vessel.

As was pointed out in my prior Patent No. 2,567,968, the strength of ammonium nitrate crystals is inversely proportional to the supersaturation of the solution in which they are grown. For periods of brief duration maximum supersaturation at which crystals of satisfactory strength for fertilizer use can be produced is about 14 pounds per 1000 gallons, whereas a limit of 3 pounds per 1000 gallons must be maintained for continuous growth. I have found that crystals equal in strength to those produced at a supersaturation of 3 pounds per 1000 gallons can be produced by my process even though a part of the crystal growth takes place in a solution having a supersaturation of 14 pounds per 1000 gallons. With the contents of the system being circulated at a rate of 0.3 to 0.6 times per minute, the circulated crystals complete a circuit of the system in approximately 1.67 to 3.33 minutes. During a circuit, in a system having the proportions shown in the drawing, about 63 per cent of this time is spent in the zone having a supersaturation of 3 pounds per 1000 gallons; 24 per cent is spent in the zone of substantially zero supersaturation; and only 13 per cent is spent in the zone having a supersaturation of 8 to 14 pounds per 1000 gallons. It is calculated that a given crystal, in growing to a diameter of 1.0 millimeter, makes 225 complete circuits of the system when the circulation rate is 0.375 volume per minute. It will be seen, therefore, that the amount of growth taking place in a single circuit is very small—approximately 0.004 millimeter per circuit. Only about 40 per cent of the growth takes place in the zone having a supersaturation of 8 to 14 pounds per 1000 gallons. Because the amount of growth taking place in the zone of relatively high supersaturation is very small, and because after each exposure to solution of relatively high supersauration the crystals are exposed to solution of relatively low and of substantially zero supersaturation, the crystals grown according to my process are equally as strong as crystals grown entirely in solution of relatively low supersaturation.

A critical feature of my process, which distinguishes it from those of the prior art, is the elutriation zone, which provides a means for segregating and withdrawing excess nuclei from a mixed and agitated suspension.

As was stated above, the rate at which new crystals are formed is greatly in excess of the rate at which crystals within the size range desired for product are produced. Depending upon the size of the product crystals and upon the rate of circulation, from 10 to 1000 crystal nuclei may be formed for each crystal grown to product size. The excess fine crystals must, of course, be removed from the system to obtain a uniformly coarse product.

According to my prior invention, described in U. S. Patent No. 2,567,968, fine crystals are segregated and coarse strong crystals are produced by employing a degree of agitation in the suspension which is greater than that normally present in a classified suspension, but which is mild enough that excess nuclei segregate above the suspension by hydraulic elutriation. The agitation provides more uniform distribution of growth and prevents the formation of structurally weak crystals near the points of entry of the supersaturated solution due to the relatively high rate of growth that would otherwise exist at those points.

The rate of circulation of liquor employed in my prior process was 0.1 to 0.3 volume per minute. When the circulation rate is increased to 0.3 to 0.6 volume per minute employed in my present process, segregation of fines no longer takes place unless, in accordance with my invention, a separate elutriation zone protected by a baffle is provided in the upper part of the suspension. Without the baffle the entire contents of the vessel would be agitated.

For best operation the area of the elutriation zone should be as large as possible. It should not be so large, however, that undue turbulence is created within the pump-suction zone. With an elutriation zone of large area, good control over the size of the product crystals can be obtained by controlling the velocity of the upward flow in the elutriation zone. If a product consisting predominantly of coarse crystals is desired, a comparatively high upward velocity in the elutriation zone is used. By this means all the fine crystals and a substantial proportion of medium-size crystals are suspended in and withdrawn from the elutriation zone. At the same time a comparatively low rate of withdrawal of product by means of the air lift is employed so as to withdraw only the coarsest crystals from the crystallizer vessel. If a product consisting of coarse- and medium-size crystals is desired, a comparatively low upward velocity is used in the elutriation zone. With a low upward velocity, only the fine crystals are suspended in the elutriation zone. A relatively high rate of withdrawal of product crystals can be employed under these conditions.

It will be seen that by regulation of flows in the elutriation zone and in the air lift, the requirements of the equation $X=Y+Z$, discussed above, can be met.

*Example*

The process of my invention is being practiced in the chemical plant of the Tennessee Valley Authority at Wilson Dam, Alabama. Five crystallizers, each of which is operated at a normal rate of 120 tons per day, are in use in this plant.

Each crystallizer vessel is 16 feet, 6 inches in diameter by 19 feet, 5 inches deep. The equipment and the proportions thereof are substantially as shown in the drawing attached hereto. The volume of liquor in the system is about 26,500 gallons. The liquor is circulated through the system at a rate of about 10,000 gallons per minute.

Concentrated ammonium nitrate feed solution is introduced into the system at a temperature of 140° F. and a concentration of 79 per cent $NH_4NO_3$, or about 1 per cent under saturation. The input rate is about 50 gallons per minute.

The circulating suspension is maintained normally at a temperature of 100° F., although temperatures ranging from 95° to 120° F. have been employed.

For normal operation about 80,000 pounds of crystals are held in suspension. Fines are removed at a rate of approximately 10 pounds per minute. An average product-crystal retention time of 10 hours is allowed.

Tests have been carried out in this equipment both with and without a baffle in the upper portion of the crystallizer vessel. The screen analysis of crystals produced under each of these conditions is given in the following table.

|  | Cumulative percentage retained on U. S. Standard screen mesh indicated ||||
| --- | --- | --- | --- | --- |
|  | +16 | +20 | +28 | +35 |
| Without baffle | 0 | 1 | 38 | 72 |
| With baffle | 12 | 62 | 89 | 94 |

The benefit derived through segregation and removal of fines as provided by the baffle in accordance with my invention can be seen from this table. The average size of the crystals produced with the baffle in place was about 10 times the size of the crystals produced without the baffle.

As a second example, consider the following case. Without elutriation of fines, it is found that the crystals produced are predominantly 35 mesh (screen opening 1/64 inch) in size as indicated in the foregoing case. If it is desired to produce a 14-mesh crystal (screen opening 3/64 inch), what conditions of operation must be specified? The larger crystal has a unit weight 27 times that of the smaller; hence only 1/27 the number of nuclei are required for seeding the suspension. The remainder must be segregated and removed. Out of every 27 nuclei formed, 26 must be destroyed to maintain a 14-mesh crystal size. The weight of nuclei destroyed can be approximated as follows:

The increase in crystal length is uniform with respect to time. For an elutriation flow of 1000 gallons per minute in a 25,000 gallon crystallizer system, nuclei will on the average be caught in the elutriation zone within 25 minutes of their time of origin. Since the average retention time is 10 hours (600 minutes), the average size of the segregated nuclei would be 25/600 of its final size with respect to length or $(25/600)^3$ with respect to volume or weight. Since 26 nuclei must be caught for each product crystal, the ratio of the nuclei to the product crystal on a weight basis is $26(25/600)^3$ or 0.02. The rate of nuclei removal must therefore be 2 per cent of the crystallization rate. In practice the segregation efficiency is less than that assumed in this example, and nuclei removal rates from 5 to 10 per cent of the crystallization rate are commonly used.

I claim as my invention:

1. The process for crystallizing ammonium nitrate which comprises maintaining within a crystallizing vessel a moving suspension of crystalline ammonium nitrate in a solution of ammonium nitrate having an average supersaturation of about 3 pounds of ammonium nitrate per 1000 gallons of solution, the upper one-sixth to one-third of the depth of said suspension being vertically divided into two zones, one of which is of substantially greater area than the other; introducing into the lower part of said suspension a stream of ammonium nitrate solution having a supersaturation of about 8 to 14 pounds of ammonium nitrate per 1000 gallons, and carrying in suspension crystals of ammonium nitrate; withdrawing from the smaller of the two said upper zones a suspension of coarse and medium-size crystals in a saturated solution at such a rate that the contents of the entire system are circulated 0.3 to 0.6 times per minute; introducing the suspension thus withdrawn from said smaller upper zone into an evaporator; therein concentrating the solution to a supersaturation of about 8 to 14 pounds per 1000 gallons; reintroducing the resulting suspension of crystals and supersaturated solution into the lower part of the said suspension in the crystallizing vessel; withdrawing from the larger of the two said upper zones a suspension consisting of relatively fine crystals of ammonium nitrate and saturated solution; dissolving the fine crystals in said suspension; introducing the resulting solution into the evaporator; introducing makeup solution of ammonium nitrate into the evaporator; and withdrawing from a lower portion of the suspension within the crystallizing vessel a suspension of relatively large crystals of ammonium nitrate.

2. The process for crystallizing ammonium nitrate which comprises maintaining within a crystallizing vessel a moving suspension of crystalline ammonium nitrate in a solution of ammonium nitrate having an average supersaturation of about 3 pounds of ammonium nitrate per 1000 gallons of solution, the upper one-sixth to one-third of the depth of said suspension being vertically divided into two zones, one of which is of substantially greater area than the other; introducing into the lower part of said suspension a stream of ammonium nitrate solution having a supersaturation of about 8 to 14 pounds of ammonium nitrate per 1000 gallons, and carrying in suspension crystals of ammonium nitrate; overflowing solution of substantially zero supersaturation from the top of the larger of the two said zones into the smaller at a rate to cause an upward flow of about 0.01 to 0.03 feet per second in the larger zone; withdrawing from the smaller of the two said upper zones a suspension of coarse and medium-size crystals in a saturated solution at such a rate that the contents of the entire system are circulated 0.3 to 0.6 times per minute and 80 to 95 per cent of all upward flow of suspension is through said smaller zone; introducing the suspension thus withdrawn from said smaller upper zone into an evaporator downward around the periphery of the evaporator, below the surface of suspension contained therein; therein concentrating the solution to a supersaturation of about 8 to 14 pounds per 1000 gallons; reintroducing the resulting suspension of crystals and supersaturated solution into the lower part of the said suspension in the crystallizing vessel; withdrawing from the larger of the two said upper zones a suspension consisting of relatively fine crystals of ammonium nitrate and saturated solution; dissolving the fine crystals in said suspension; introducing the resulting solution into the evaporator; introducing makeup solution of ammonium nitrate into the evaporator; and withdrawing from a lower portion of the suspension within the crystallizing vessel a suspension of relatively large crystals of ammonium nitrate.

References Cited in the file of this patent

UNITED STATES PATENTS

| | | |
|---|---|---|
| 2,164,112 | Jeremiassen | June 27, 1939 |
| 2,567,968 | Saeman | Sept. 18, 1951 |